United States Patent Office 2,902,633
Patented Sept. 1, 1959

2,902,633

HOUSING CONTAINING ELECTRICAL CRYSTAL SURROUNDED BY SILOXANE RESIN-CALCIUM CHLORIDE COMPOSITION

Robert F. Durst, Orange, and Bernard Jacobs, Clifton, N.J., assignors to International Telephone and Telegraph Corporation, New York, N.Y., a corporation of Maryland No Drawing. Application May 20, 1954
Serial No. 431,266

2 Claims. (Cl. 317—234)

This invention relates to a sealing compound for the protection of rectifier crystals such as germanium, silicon, etc., against deterioration from moisture. More particularly, this invention relates to a protective sealing compound comprising a dessicant and a composition of silicone.

It is known to the crystal-rectifier and transistor manufacturing industry that the operation of rectifier crystals is materially affected by moisture penetration. Therefore, the industry has been endeavoring for many years to develop a sealing compound which protects the rectifiers from the deleterious effects of moisture. Most of the known forms of sealing compounds are unsatisfactory for either technical or economical reasons.

Accordingly, it is an object of this invention to provide a rectifier crystal protective sealing compound which offers greater protection to the crystal from moisture effects than the compounds heretofore known.

In accordance with an aspect of this invention, there is provided a protective sealing compound comprising a co-polymer of dimethylsiloxane, phenylmethylsiloxane and trimethylsiloxane mixed with silica, and calcium chloride, the percentage of calcium chloride being less than the co-polymer. The co-polymer has an average of about 2.05 total phenyl and methyl groups per silicone atom. The configuration of the siloxane is a linear end-blocked polymer.

The above-mentioned and other features and objects of this invention and the manner of attaining them will become more apparent and the invention itself will be best understood by the following description of an embodiment of the invention.

The protective sealing compound of this invention comprises the co-polymer identified above mixed with fumed silica, the silica being in the proportion approximately 20% by weight. This compound may be commercially purchased and is known by the trade name Dow Corning, DC-5, silicone grease. The invention is characterized by mixing with silicone grease anhydrous calcium chloride; the proportion of the calcium chloride being in the range of 2–20% by weight, the preferred proportion being 5%. The compound is prepared by pulverizing the calcium chloride to very fine granular particle sizes, for example, finer than 100 mesh. The powder is then dispersed by any well known method in the grease. The resulting composition is of such consistency that it may be applied around the crystal contained within a protective container, e.g. by means of a standard hypodermic syringe.

It is to be realized that other compositions of silicone may be used, for example, in place of silicone grease, other well-known silicone fluids may be substituted. And in place of the silica, other water impervious materials may be used such as aluminum stearate or similar, metal soaps, calcined clay, etc. However, it has been observed that only calcium chloride may be satisfactorily utilized as the dessicant in this composition.

While we have described above the principles of our invention in connection with specific compositions, it is to be clearly understood that this description is made only by way of example and not as a limitation of the scope of our invention as set forth in the objects thereof and in the accompanying claims.

What is claimed is:
1. A protective arrangement for an electric crystal, comprising a housing, means for supporting said crystal within said housing, and means for preventing moisture from reaching said crystal comprising a dessicant and water repellant composition surrounding said crystal, said composition comprising a co-polymer of dimethylsiloxane, phenylmethylsiloxane and trimethylsiloxane, the co-polymer having an average of about 2.05 total phenyl and methyl groups per silicone atom, and the dessicant being anhydrous calcium chloride in the form of a pulverulent powder the particle size being no larger than 100 mesh, the percentage of calcium chloride being between 2 and 20% by weight of the composition.

2. A protective arrangement according to claim 1 wherein said calcium chloride is approximately 5% of the composition by weight.

References Cited in the file of this patent

UNITED STATES PATENTS

| | | |
|---|---|---|
| 2,756,171 | Thomas | July 24, 1956 |

FOREIGN PATENTS

| | | |
|---|---|---|
| 640,162 | Great Britain | July 12, 1950 |
| 689,609 | Great Britain | Apr. 1, 1953 |